(12) United States Patent
Banerjee et al.

(10) Patent No.: US 10,454,698 B1
(45) Date of Patent: Oct. 22, 2019

(54) METHODS AND APPARATUS FOR NON-BLOCKING IP MULTICAST DELIVERY OF MEDIA DATA USING SPINE AND LEAF ARCHITECTURES

(71) Applicant: Cisco Technology, Inc., San Jose, CA (US)

(72) Inventors: Ayan Banerjee, Fremont, CA (US); Ann Roshini Paul, San Jose, CA (US); Srinivasan Ramabadran, San Jose, CA (US); Chandrasekhar V Modumudi, San Jose, CA (US); Rahul Parameswaran, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 15/792,654

(22) Filed: Oct. 24, 2017

(51) Int. Cl.
*H04L 12/18* (2006.01)
*H04L 12/54* (2013.01)
(Continued)

(52) U.S. Cl.
CPC ........ *H04L 12/1886* (2013.01); *H04L 12/185* (2013.01); *H04L 12/189* (2013.01);
(Continued)

(58) Field of Classification Search
CPC .............. H04L 12/1886; H04L 12/189; H04L 12/5601; H04L 12/185; H04L 45/04; H04L 12/4675; H04W 72/005
See application file for complete search history.

(56) References Cited

U.S. PATENT DOCUMENTS 9,584,397 B2    2/2017   Ghanwani et al.
2009/0190474 A1   7/2009   Gahm et al.
(Continued)

OTHER PUBLICATIONS

Cisco, "Cisco Nexus 9000 Series NX-OS IP Fabric for Media Solution Guide, Releases 7.0(3)I4(5), 7.0(3)F2(1), and Later Releases", Dec. 22, 2016 & Aug. 25, 2017, 74 pages.
(Continued)

*Primary Examiner* — Lakeram Jangbahadur
(74) *Attorney, Agent, or Firm* — Merchant & Gould P.C.

(57) ABSTRACT

In one illustrative example, an IP network media data router includes a spine and leaf switch architecture operative to provide IP multicast delivery of media data from source devices to receiver devices. The architecture may include K spine switches, K sets of L leaf switches, M data links between each leaf switch and each spine switch where each data link has a maximum link bandwidth of $BW_L$, and a plurality of bidirectional data ports connected to each leaf switch. Notably, the router is provided or specified with a number of bidirectional data ports $N=(a/K)\times(BW_L/BW_P)$ for a guaranteed non-blocking IP multicast delivery of data at a maximum port bandwidth of $BW_P$, where "a" is a fixed constant greater than or equal to K. The architecture may be reconfigurable or expandable to include C additional spine switches and C additional sets of L leaf switches. The reconfiguration may provide for a redistribution or reconnection of the M data links, so that the new number of M data links between each leaf switch and each spine switch is $M_{new}=(K_{old}\times M_{old})/(K_{old}+C)=a/K_{new}$. The reconfiguration provides a new maximum number of bidirectional data ports as $N_{new}=(a/K_{new})\times(BW_L/BW_P)$ for maintaining the non-blocking IP multicast delivery of data at a maximum port bandwidth of $BW_P$.

18 Claims, 11 Drawing Sheets

(51) Int. Cl.
*H04W 72/00* (2009.01)
*H04L 12/46* (2006.01)
*H04L 12/715* (2013.01)

(52) U.S. Cl.
CPC ....... *H04L 12/5601* (2013.01); *H04W 72/005* (2013.01); *H04L 12/4675* (2013.01); *H04L 45/04* (2013.01)

(56) References Cited

U.S. PATENT DOCUMENTS

| | | | | |
|---|---|---|---|---|
| 2012/0250574 | A1* | 10/2012 | Marr | G02B 6/354 370/254 |
| 2013/0163611 | A1* | 6/2013 | Armstrong | H04L 47/78 370/437 |
| 2014/0258485 | A1* | 9/2014 | Yang | H04L 41/12 709/223 |
| 2015/0124614 | A1* | 5/2015 | Alizadeh Attar | H04L 47/50 370/235 |
| 2015/0127797 | A1* | 5/2015 | Attar | H04L 47/125 709/223 |
| 2015/0131655 | A1* | 5/2015 | Dayama | H04L 12/185 370/390 |
| 2015/0188808 | A1 | 7/2015 | Ghanwani et al. | |

OTHER PUBLICATIONS

Implementing Mulitcast Routing on Cisco IOS XR Software, 24 pages.

Cai, Y. et al, "Protocol Independent Multicast Equal-Cost Multipath (ECMP) Redirect", Internet Engineering Task Force, Oct. 2012, 12 pages.

Cisco, White paper, "Cisco Data Center Spine-and-Leaf Architecture: Design Overview", 2016, pp. 1-27.

Cisco, White paper, "Cisco IP Fabric for Media, Design Guide", Jun. 2007, pp. 1-34.

* cited by examiner

US 10,454,698 B1

METHODS AND APPARATUS FOR NON-BLOCKING IP MULTICAST DELIVERY OF MEDIA DATA USING SPINE AND LEAF ARCHITECTURES

TECHNICAL FIELD

The present disclosure relates generally to methods and apparatus for use in providing a non-blocking IP multicast delivery of media data, and more particularly, methods and apparatus for use in providing a non-blocking IP multicast delivery of media data using spine and leaf architectures.

BACKGROUND

There is a need to provide a non-blocking IP multicast delivery of media data in an IP network media data router, especially for use in the delivery of media data comprising video (or more specifically, video for live studio broadcast production), for the replacement of serial digital interface (SDI) based technology utilizing cross-bar switches.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
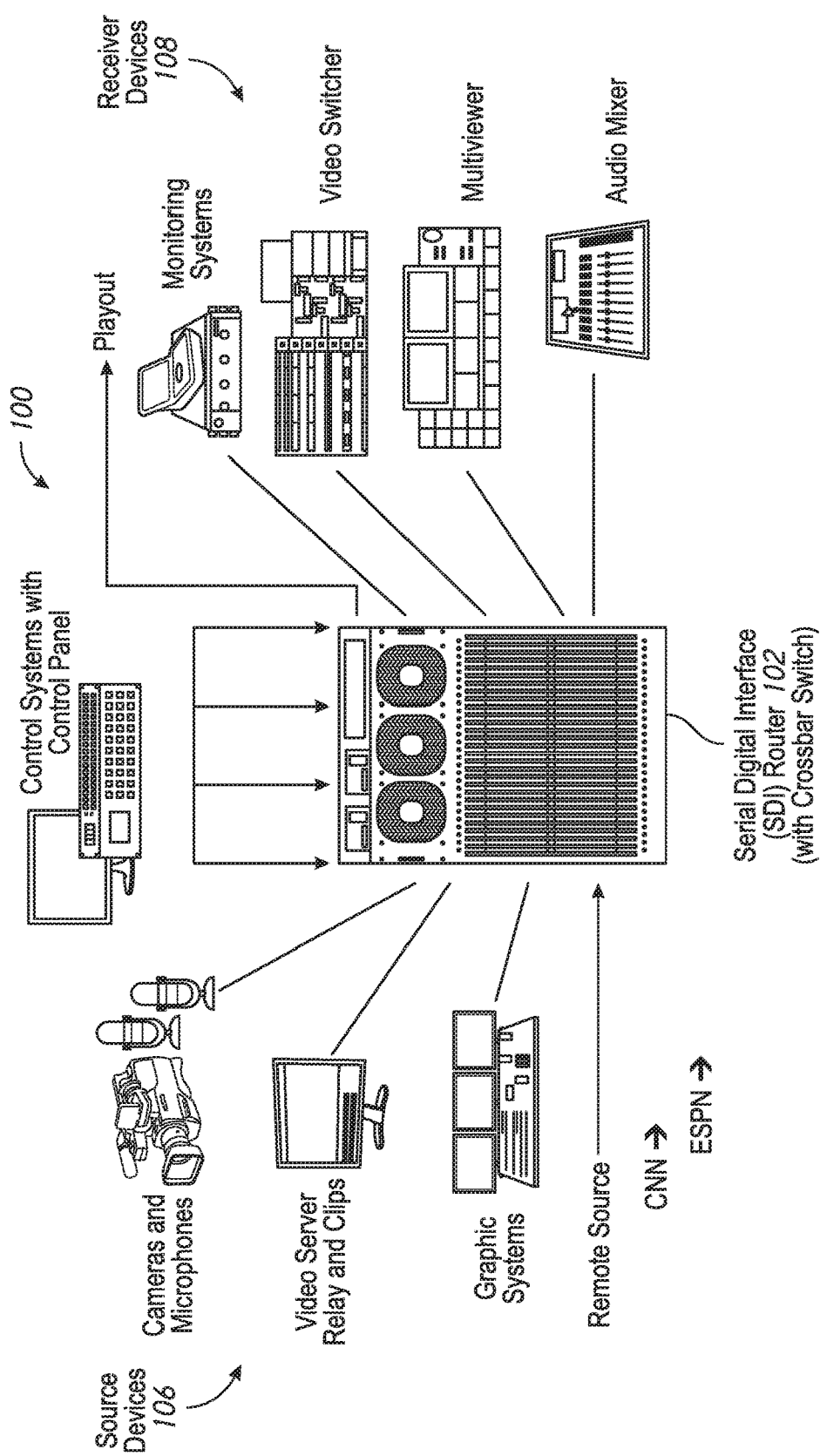
FIG. 1 is an illustration of a system for delivering media data with use of a serial digital interface (SDI) router having a crossbar switch.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Methods and apparatus for use in providing a non-blocking IP multicast delivery of data using spine and leaf architectures are described herein. The methods and apparatus of the present disclosure may be suitable for use in the delivery of data comprising media data (e.g. video), and more specifically, video for live studio broadcast production.

In one illustrative example, an IP network media data router may include a spine and leaf switch architecture operative to provide IP multicast delivery of data from source devices to receiver devices. The spine and leaf switch architecture may include K spine switches (where e.g. K=1, 2, 3, or 4), K sets of L leaf switches, M data links between each leaf switch and each spine switch where each data link is provided with a maximum link bandwidth of $BW_L$, and a plurality of bidirectional data ports (i.e. for source and receiver connections) connected to each leaf switch.

In preferred implementations, the router may be provided or specified with a maximum number of bidirectional data ports $$N=(a/K) \times (BW_L/BW_P)$$

for non-blocking IP multicast delivery of data at a maximum port bandwidth of $BW_P$, where a is a fixed constant greater than or equal to K. More specifically, the non-blocking IP multicast delivery may be a guaranteed non-blocking IP multicast delivery. More generally, the number of bidirectional data ports provided for use may be $N \leq (a/K) \times (BW_L/BW_P)$ for providing the non-blocking feature.

In some implementations, the router having the spine and leaf switch architecture may be reconfigurable and/or expandable to include C additional spine switches and C additional sets of L leaf switches (e.g. of the same or similar manufacture). The reconfiguration may provide for a redistribution or reconnection of the M data links such that the number of data links between each leaf switch and each spine switch is $M_{new} = (K_{old} \times M_{old})/(K_{old}+C) = a/K_{new}$. The reconfiguration may further provide for a limitation on or reduction of the number of bidirectional data ports to $N_{new}=(K_{old} \times N_{old})(K_{old}+C)$, or alternatively a limitation on or reduction of the maximum port bandwidth to $BW_{P\ new}=(K_{old} \times BW_{P\ old})/(K_{old}+C)$. Here, a new maximum number of bidirectional data ports $N_{new}=(a/K_{new}) \times (BW_L BW_P)$ is provided or specified for non-blocking IP multicast delivery of data at a maximum port bandwidth of $BW_P$.

Advantageously, the router may be configured (as well as reconfigured and expanded) to provide a (e.g. guaranteed) non-blocking IP multicast delivery of media data, such that (most) any traffic flow pattern or combination may be achieved.

In some related implementations, the spine and leaf architecture may operate to select from a first plurality of M data links (e.g. in a generally round robin fashion) with a first one of the K spine switches for IP multicast delivery from source devices while a first bandwidth limit on the first plurality of M data links has not been reached. The spine and leaf architecture may further operate to select from a second plurality of M data links (e.g. in a generally round robin fashion) with a second one of the K spine switches for IP multicast delivery from additional source devices while the first bandwidth limit on the first plurality of M data links has been reached, and a second bandwidth limit of the second plurality of M data links has not been reached. Here, the spine and leaf architecture may perform token allocation procedures for tracking first and second used/unused bandwidths of the first and the second pluralities of M data links. The token allocation procedure may be performed with use of stored associations between the first and the second pluralities of M data links and available tokens.

Example Embodiments

Referring to FIG. 1, a system 100 for delivery of media data with use of a serial digital interface (SDI) router 102 is shown. System 100 with SDI router 102 may be used for the communication of media signals, such as video signals. As shown, a plurality of source devices 106 may connect to SDI router 102 to send media signals. Source devices 106 may include cameras and microphones, video server relay and clips, graphic systems, remote sources, television broadcast sources (e.g. CNN, ESPN television signal sources), and/or any other suitable source devices. A plurality of receiver devices 108 may connect to SDI router 102 to receive media signals from any one of the sources devices 106. As illustrated, receiver devices 108 may include monitoring systems, video switches, multiviewers, audio mixers, and/or any other suitable receiver devices.

SDI router 102 includes a crossbar switch having multiple input and output lines that form a crossed pattern of interconnecting lines between which a connection may be established. An input line may be "tapped" to send media signals from one of source devices 106 so that the media signals may be received by multiple receiver devices 108 on multiple output lines. Note that the crossbar switch is not easily scalable or expandable, and the input and output lines of the crossbar switch have fixed bandwidths.

Accordingly, there is a need for an IP network data router for the delivery of data, such as media data, especially for use in the replacement of SDI technology utilizing cross-bar switches. There is a further need for an IP network media data router to provide a non-blocking IP multicast delivery of media data (e.g. a guaranteed non-blocking delivery), such as for video for live studio broadcast production.

Figure 2:
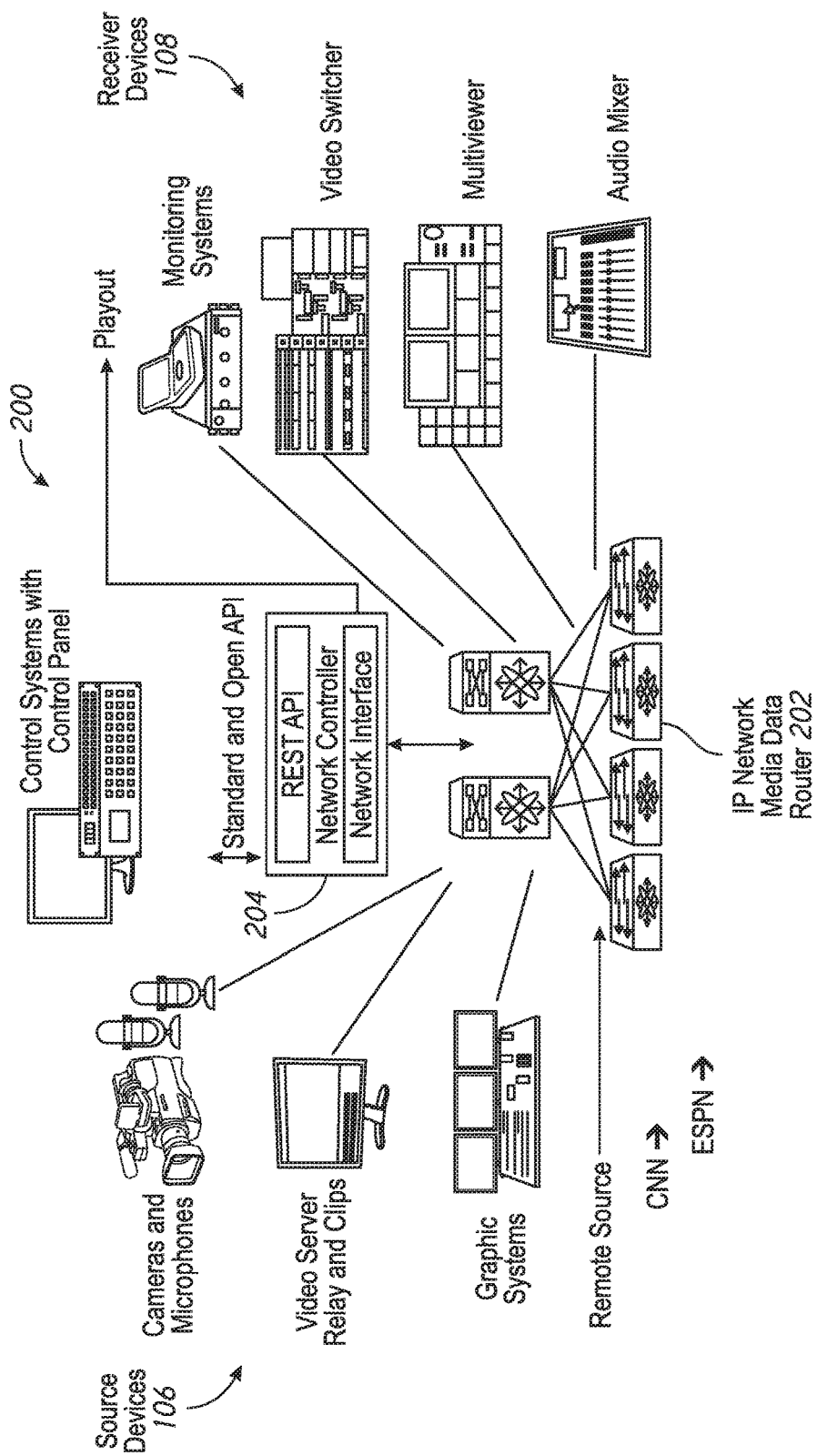
FIG. 2 is an illustration of a system for use in delivering a non-blocking IP multicast of media data with use of an IP network media data router.

FIG. 2 is an illustration of a system 200 for use in delivering a IP multicast of media data with use of IP network media data router 202. The IP network media data router 202 may be operative to provide IP multicast delivery of media data from source devices 106 to receiver devices 108.

The source devices 106 may connect to router 202 to send media data (e.g. video data) via IP multicast delivery, and the receiver devices 108 may connect to router 202 to receive the media data via the IP multicast delivery from any one of the sources devices 106. As shown in FIG. 2, a network controller 204 may be provided to connect to router 202 via a network interface, for control by one or more control systems via an application programming interface (API) (e.g. a REpresentational State Transfer or REST API).

Figure 3A:
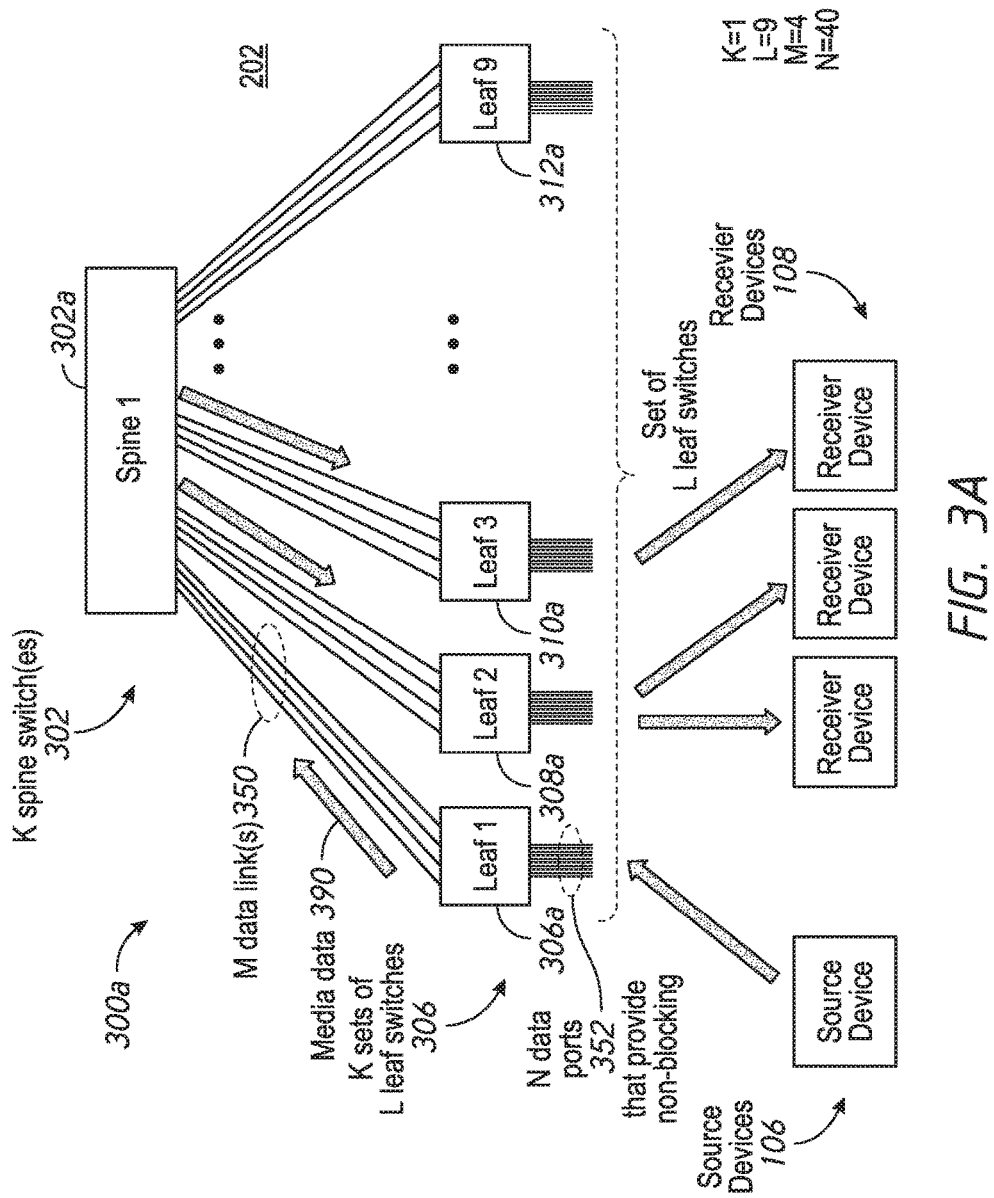
FIG. 3A is an illustration of an example of a spine and leaf switch architecture of an IP network media data router according to some implementations of the present disclosure.

FIG. 3A is an illustration of one example of a spine and leaf switch architecture 300a of IP network media data router 202 according to some implementations of the present disclosure. Spine and leaf switch architecture 300a of router 202 of FIG. 3A is operative to provide IP multicast delivery of media data from source devices 106 to receiver devices 108. To provide IP multicast delivery, spine and leaf switch architecture 300a may operate with use of a multicast protocol, such as Internet Group Management Protocol (IGMP) or other suitable protocol.

As illustrated in FIG. 3A, spine and leaf switch architecture 300a may include K spine switches 302 (e.g. spine switch 302a), K sets of L leaf switches 306 (e.g. leaf switches 306(a), 308a, 310a, through 312a for a total of 9 leaf switches), M data links 350 between each leaf switch and each spine switch, and a plurality of bidirectional data ports 352 (i.e. for source and receiver connections) connected to each leaf switch. Each one of data links 350 may be provided or set with a maximum link bandwidth of $BW_L$.

Source devices 106 and receiver devices 108 may connect to any of the bidirectional data ports 352 for the communication of media data. Note that, although data ports 352 are bidirectional, their use in practice is highly asymmetrical (i.e. one-way, depending on whether the connected device is a source or a receiver). Also note that in actual practice, the number of receiver devices 108 connected to bidirectional data ports 352 may far exceed the number of source devices 106 connected to bidirectional data ports 352.

To illustrate the basic approach and use in relation to FIG. 3A, one of source devices 106 may send media data through one of bidirectional data ports 352 of leaf switch 306(a). An IP multicast of the media data (e.g. media data 390) may be sent from leaf switch 306(a) up to spine switch 302a, and then down to leaf switches 308a and 310a. Two of the receiver devices 108 may receive the media data via leaf switch 308a as shown, and another one of the receiver devices 108 may receive the media data via leaf switch 310a as shown.

In preferred implementations, the router 202 may be provided and/or specified with a maximum number of the bidirectional data ports 352

$$N=(a/K) \times (BW_L/BW_P)$$

for non-blocking IP multicast delivery of data at a maximum port bandwidth of $BW_P$, where a is a fixed constant greater than or equal to K. More specifically, the non-blocking of IP multicast delivery may be a guaranteed non-blocking IP multicast delivery.

In some implementations, the router 202 has exactly N bidirectional data ports connected to each leaf switch as specified above. More generally, the number of bidirectional data ports provided for use in the router 202 may be $N \leq (a/K) \times (BW_L/BW_P)$ for guaranteed non-blocking IP multicast delivery.

Note that when the property or constraint of $N \leq (a/K) \times (BW_L/BW_P)$ is satisfied (i.e. the non-blocking feature is in effect), any or most any traffic flow pattern using source and receiver devices 106 and 108 connected to bidirectional data ports 352 may be achieved. When the property or constraint is violated (i.e. $N > (a/K) \times (BW_L/BW_P)$), the non-blocking aspect may not hold and is not guaranteed. Connectivity between source and receiver devices 106 and 108 may degrade gradually. Some of receiver devices 108 may not be able to receive their traffic flows, and this depends on the input traffic matrix, the position of the source and receiver devices in the network topology.

Figure 3B:
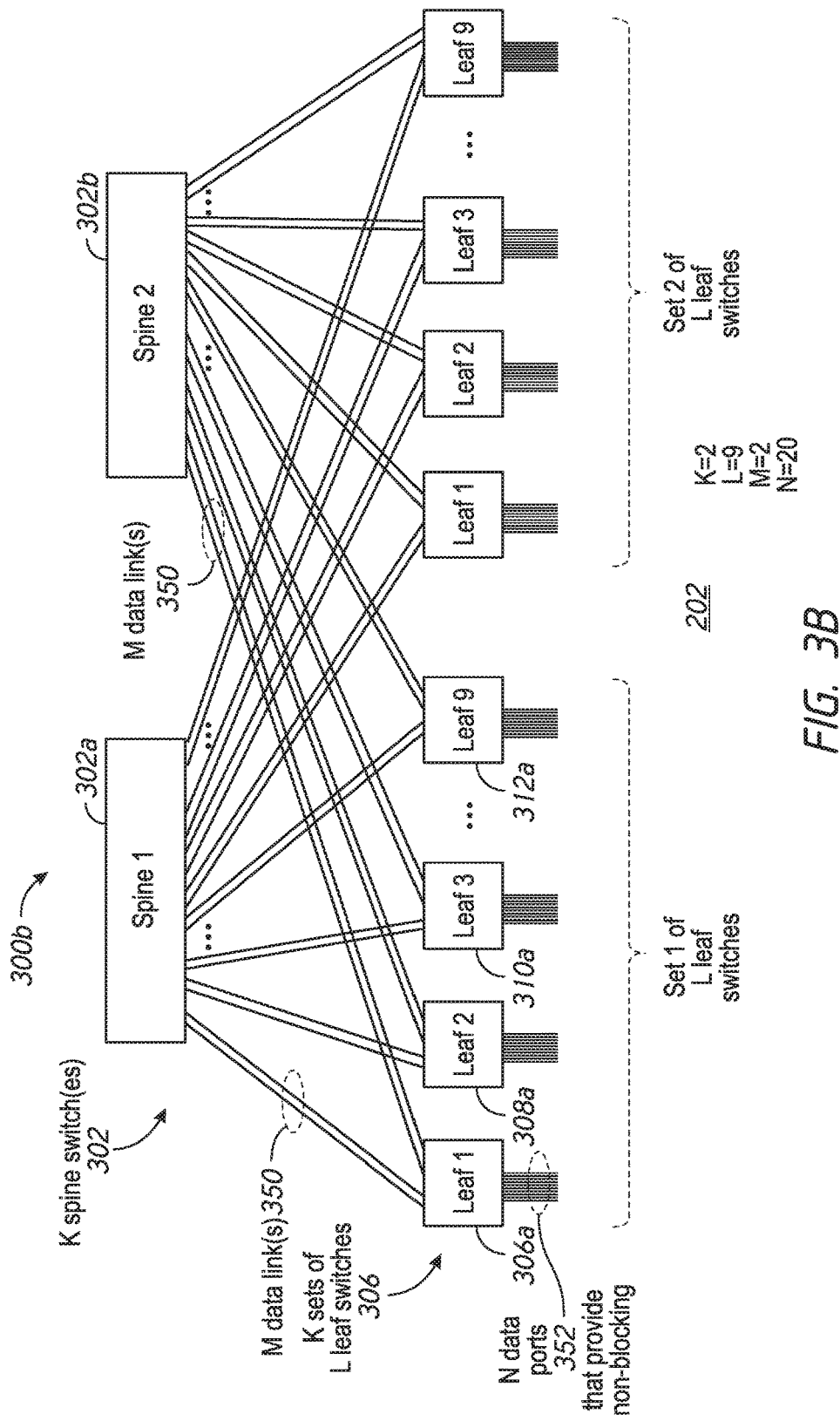
FIG. 3B is an illustration of another example of a spine and leaf switch architecture of an IP network media data router according to some implementations of the present disclosure.
Figure 3C:
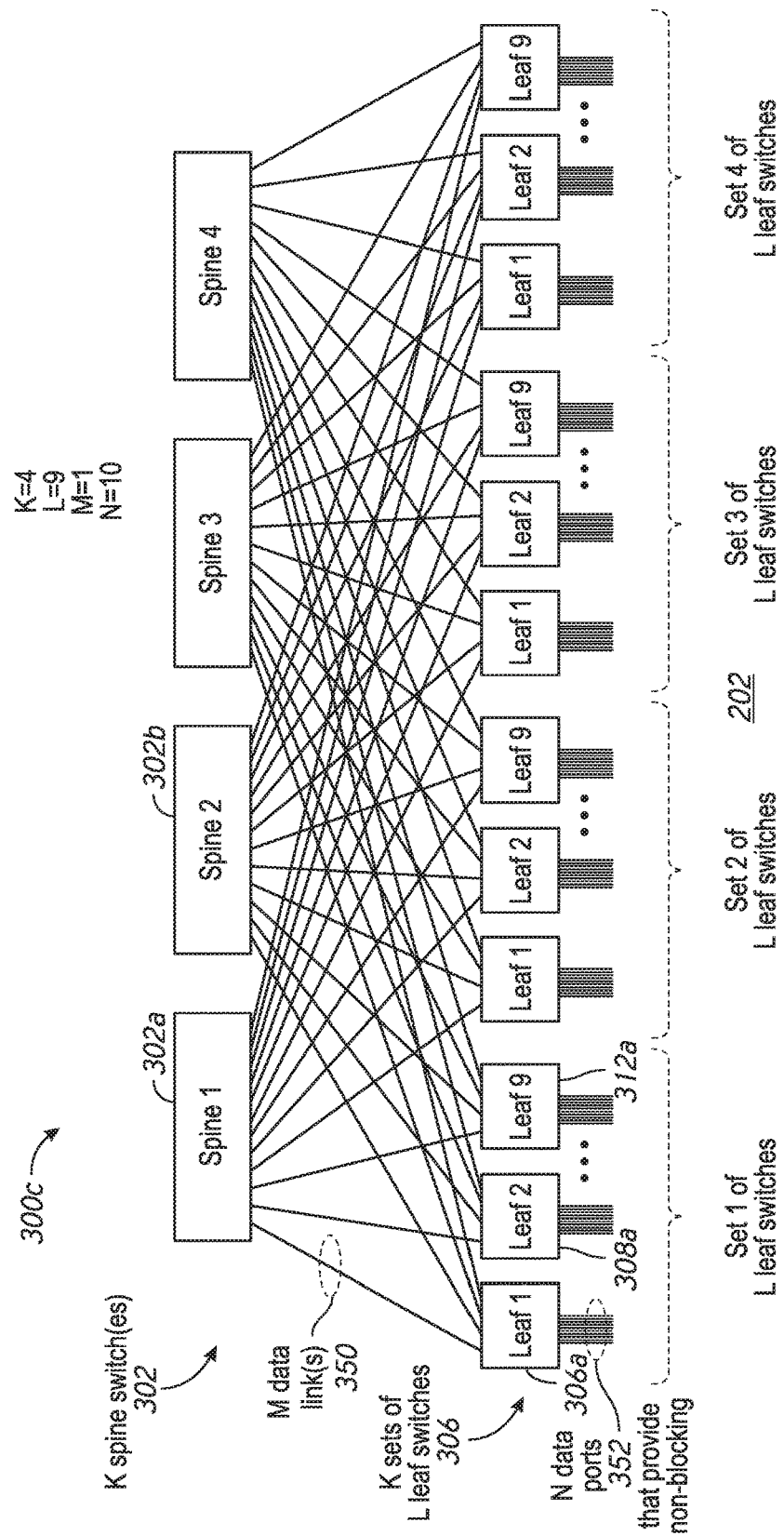
FIG. 3C is an illustration of yet another example of a spine and leaf switch architecture of an IP network media data router according to some implementations of the present disclosure.

Reviewing the mathematical expressions and relationships provided by the architecture, router 202 may be configured with the property of $M \times BW_L \geq N \times BW_P$. "M" may be a function of K, where $M = (a/K)$. Here, "a" is a special case of M where K=1. The fixed value of "a" may be any suitable number greater than K, such as any number greater than two (2), or more specifically $2 \leq K \leq 10$. In the implementations of FIGS. 3A, 3B, and 3C, the fixed value of "a"=4. Note that the maximum link bandwidth of $BW_L$ may also generally be a fixed value and remain unchanged, even though the number of M data links may be redistributed and/or reconnected to additional spine switches in a reconfiguration or expansion. Substituting $M = (a/K)$ in the expression $M \times BW_L \geq N \times BW_P$, then $(a/K) \times BW_L \geq N \times BW_P$. Solving for N, then the allowable number of bidirectional data ports $N \leq (a/K) \times (BW_L/BW_P)$. Note that, throughout the disclosure, the absolute value of N may be used where the right-hand side of the expression $N \leq (a/K) \times (BW_L/BW_P)$ is not a whole number.

In FIG. 3A, it is shown that spine and leaf switch architecture 300a is configured such that K=1, L=9, M=4, and N=40. In addition, $a = K \times M = 4$. The bandwidth of a data link may be expressed in speed or bits per second (bps), such as Gigabits per second (Gbps). In this example, the maximum link bandwidth $BW_L$ of a data link may be provided or set to be 100 Gbps and the maximum port bandwidth $BW_P$ of a bidirectional data port may be provided or set to be 10 Gbps. With reference to the expression $N = (a/K) \times (BW_L/BW_P)$, $N = (4/1) \times (100 \text{ Gbps}/10 \text{ Gbps}) = 40$. Thus, router 202 of FIG. 3A may be provided or specified with a maximum of forty (40) bidirectional data ports 352 that may be used for (guaranteed) non-blocking IP multicast delivery of data at a maximum port bandwidth of $BW_P$. Note that any suitable parameters (K, L, M, N, $BW_L$, $BW_P$, etc.) may be utilized, which may depend on the implementation or requirements; the above parameters are merely provided as an illustrative example.

In some implementations, the spine and leaf switch architecture 300a may be reconfigurable and/or expandable to include C additional spine switches and C additional sets of L leaf switches (e.g. of the same or similar manufacture), e.g. for natural numbers of $(K \times M)/(K+C)$. The reconfiguration or expansion may provide for or include a redistribution or reconnection of the M data links 350 such that the new number of M data links 350 between each leaf switch and each spine switch is $M_{new} = (K_{old} \times M_{old})/(K_{old} + C) = a/K_{new}$. The reconfiguration may further provide for or include a limitation on or reduction of the number of bidirectional data ports 352 to $N_{new} = (K_{old} \times N_{old})/(K_{old} + C)$. Alternatively, the reconfiguration may provide or include a limitation on or reduction of the maximum port bandwidth to $BW_{P\ new} = (K_{old} \times BW_{P\ old})/(K_{old} + C)$. Such a reconfiguration provides or specifies a new maximum number of bidirectional data ports $N_{new} = (a/K_{new}) \times (BW_L/BW_P)$ which maintains non-blocking IP multicast delivery of data at a maximum port bandwidth of $BW_P$. Thus, the spine and leaf switch architecture 300a may be reconfigured or expanded without loss of the advantageous non-blocking feature.

FIG. 3B is an illustration of another example of a spine and leaf switch architecture 300b of IP network media data router 202 according to some implementations of the present disclosure.

The spine and leaf switch architecture 300b of FIG. 3B may be substantially the same as or similar to the design of spine and leaf switch architecture 300a of FIG. 3A, except that the architecture has been reconfigured and/or expanded to include C additional spine switches (where C=1, for a total number of 2 spine switches) and C additional sets of L leaf switches (where C=1, for a total number of 2 sets of 9 leaf switches=18 leaf switches) as just previously described.

More specifically, in the previous spine and leaf switch architecture 300a of FIG. 3A, K=1, L=9, M=4, and N=40. Reconfiguring to the spine and leaf switch architecture 300b of FIG. 3B, $K_{new} = K_{old} + C = 1 + 1 = 2$; $L_{new} = (K_{old} + C) \times L_{old} = (1+1) \times 9 = 18$; $M_{new} = (K_{old} \times M_{old})/(K_{old} + C) = (1 \times 4)/(1+1) = 2$; and $N_{new} = (K_{old} \times N_{old})/(K_{old} + C) = (1 \times 40)/(1+1) = 20$. The maximum link bandwidth $BW_L$ of a data link may be maintained to be 100 Gbps and the maximum port bandwidth $BW_P$ of a bidirectional data port may be maintained to be 10 Gbps. With reference to the expression $N_{new} = (a/K_{new}) \times (BW_L/BW_P)$, $N_{new} = (4/2) \times (100 \text{ Gbps}/10 \text{ Gbps}) = 20$. Thus, router 202 of FIG. 3B may now be provided or specified with a new maximum number of twenty (20) bidirectional data ports 352 for (guaranteed) non-blocking IP multicast delivery of data at a maximum port bandwidth of $BW_P$.

FIG. 3C is an illustration of yet another example of a spine and leaf switch architecture 300c of IP network media data router 202 according to some implementations of the present disclosure.

The spine and leaf switch architecture 300c of FIG. 3C may be substantially the same as or similar to the design of spine and leaf switch architecture 300b of FIG. 3B, but where spine and leaf switch architecture 300b is reconfigured and/or expanded to include C additional spine switches (where C=2, for a total number of 4 spine switches) and C additional sets of L leaf switches (where C=2, for a total number of 4 sets of 9 leaf switches=36 leaf switches) as previously described.

More specifically, in the previous spine and leaf switch architecture 300b of FIG. 3B, K=2, L=18, M=2, and N=20. Reconfiguring to the spine and leaf switch architecture 300c of FIG. 3C, $K_{new} = K_{old} + C = 2 + 2 = 4$; $L_{new} = (K_{old} + C) \times L_{old} = (2+2) \times 9 = 36$; $M_{new} = (K_{old} \times M_{old})/(K_{old} + C) = (2 \times 2)/(2+2) = 1$; and $N_{new} = (K_{old} \times N_{old})/(K_{old} + C) = (2 \times 20)/(2+2) = 40/4 = 10$. The maximum link bandwidth $BW_L$ of a data link may be maintained to be 100 Gbps, and the maximum port bandwidth $BW_P$ of a bidirectional data port may be maintained to be 10 Gbps. With reference to the expression $N_{new} = (a/K_{new}) \times (BW_L/BW_P)$, $N_{new} = (4/4) \times (100 \text{ Gbps}/10 \text{ Gbps}) = 10$. Thus, router 202 of FIG. 3B may now be provided or specified with a new maximum number of ten (10) bidirectional data ports 352 for (guaranteed) non-blocking IP multicast delivery of data at a maximum port bandwidth of $BW_P$.

Note that, as an alternative to the above-described reduction in the number of the bidirectional data ports in relation to FIGS. 3B and 3C, the maximum port bandwidth may be limited or reduced to $BW_{P\ new} = (K_{old} \times BW_{P\ old})/(K_{old} + C)$ while maintaining the same provided or specified maximum number of bidirectional data ports for (guaranteed) non-blocking IP multicast delivery.

Figure 4A:
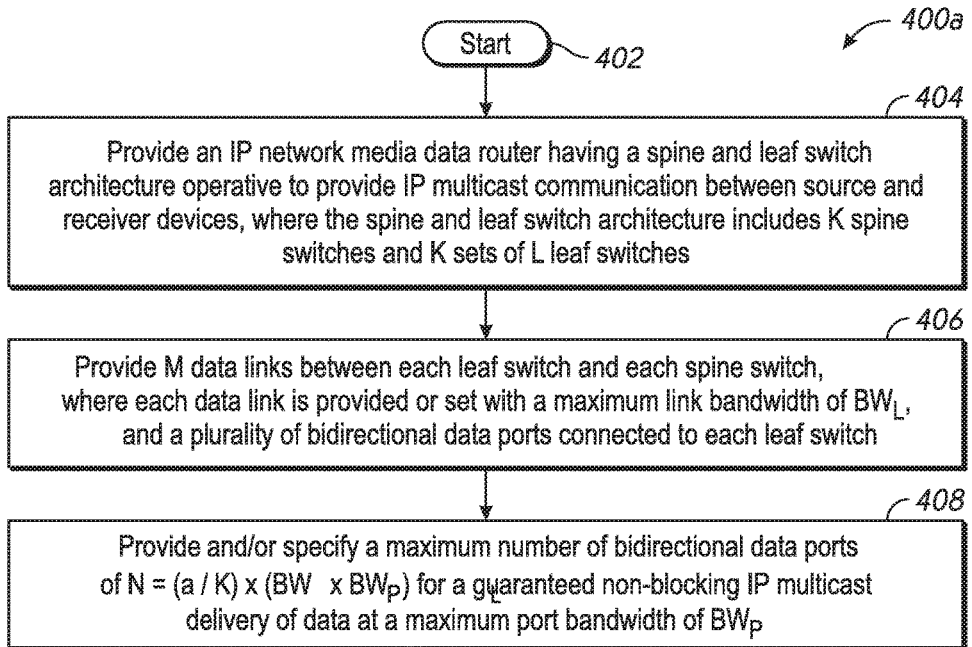
FIGS. 4A and 4B are flowcharts for describing a method for use in providing a (e.g. guaranteed) non-blocking IP multicast delivery of media data with use of an IP network media data router according to some implementations of the present disclosure.
Figure 4B:
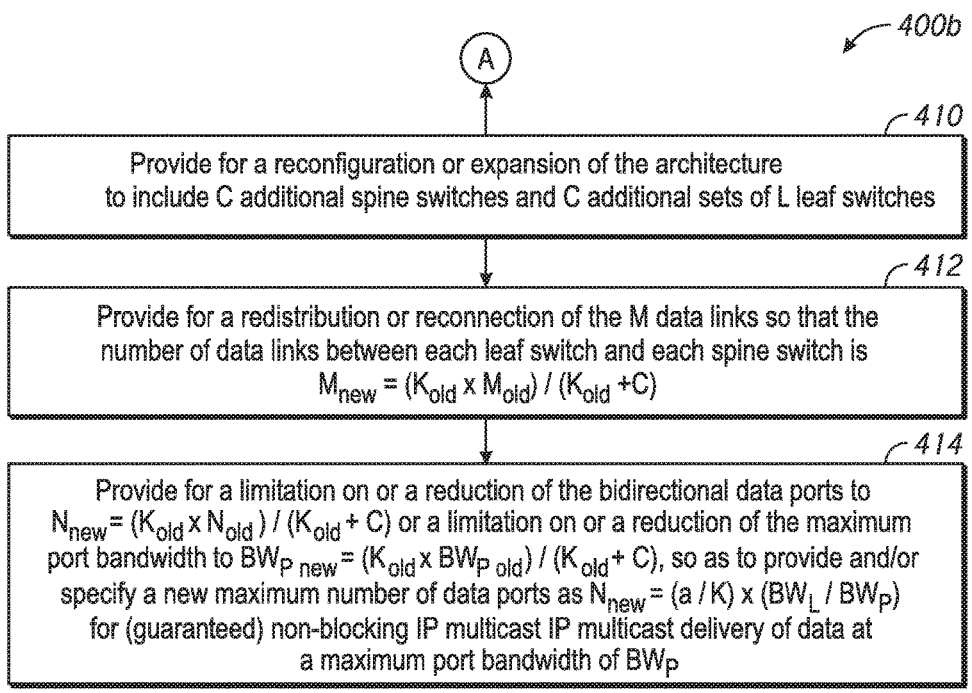

For use in restating the above, FIGS. 4A and 4B are flowcharts 400a and 400b for describing a method for use in providing a (e.g. guaranteed) non-blocking IP multicast delivery of media data with use of an IP network media data router according to some implementations of the present disclosure.

Beginning at a start block 402 of FIG. 4A, an IP network media data router is provided with a spine and leaf switch architecture operative to provide IP multicast communications from source devices to receiver devices (step 404 of FIG. 4A). The spine and leaf switch architecture may include K spine switches (e.g. where K=1, 2, 3, or 4) and K sets of L leaf switches. M data links between each leaf switch and each spine switch may be provided where each data link is provided or set with a maximum link bandwidth of $BW_L$, and a plurality of bidirectional data ports may be connected to each leaf switch (step 406 of FIG. 4A). The IP network data router may be provided and/or specified with a maximum number of the bidirectional data ports $N=(a/K) \times (BW_L/BW_P)$ for a (e.g. guaranteed) non-blocking IP multicast delivery of data at a maximum port bandwidth of $BW_P$ (step 408 of FIG. 4A), such that (most) any traffic flow pattern or combination may be achieved. More generally, the number of bidirectional data ports provided for use in the router may be $N \leq (a/K) \times (BW_L/BW_P)$ for the guaranted non-blocking feature. The method may continue via a connector A to flowchart 400b in FIG. 4B.

Continuing with the method via the connector A in FIG. 4B, a reconfiguration or expansion of the architecture may be provided to include C additional spine switches and C additional sets of L leaf switches (step 410 of FIG. 4B). The reconfiguration or expansion may provide for a redistribution and/or reconnection of at least some of the M data links, so that the number of data links between each leaf switch and each spine switch is $M_{new}=(K_{old} \times M_{old})/(K_{old}+C)$ (step 412 of FIG. 4B). The reconfiguration or expansion may further provide for a limitation on or a reduction of the number of bidirectional data ports to $N_{new}=(K_{old} \times N_{old})/(K_{old}+C)$, such that the relation $N_{new}=(a/K_{new}) \times (BW_L BW_P)$ is maintained (step 414 of FIG. 4B). Alternatively, the reconfiguration or expansion may further provide for a limitation on or a reduction of the maximum port bandwidth to $BW_{P\,new}=(K_{old} \times BW_{P\,old})/(K_{old}+C)$, such that the relation $N_{new}=(a/K_{new}) \times (BW_L/BW_P)$ is maintained (alternative step 414 of FIG. 4B). Thus, the (e.g. guaranteed) non-blocking feature of the IP multicast delivery may be easily and efficiently maintained after reconfiguration or expansion, such that (most) any traffic flow pattern or combination may be achieved.

In some implementations of the present disclosure, step 410 may be performed at least in part by reconnecting at least some of the data links between each leaf switch and each spine switch. Also in some implementations, step 410 may be performed at least in part by providing instructions or guidelines on the connecting or reconnecting of the data links. Even further in some implementations, step 412 may be performed at least in part by limiting the number or use of the bidirectional data ports. Also in some implementations, step 412 may be performed at least in part by providing instructions or guidelines on limiting the number or use of the bidirectional data ports.

Context for the operational description of FIGS. 5A-5B, 6A-6B, and 7 for an IP network media data router of some implementations is now provided. Reference will be made back to the spine and leaf switch architecture 300b of FIG. 3B, where K≥2. The spine and leaf switch architecture 300b of FIG. 3B (as well as the architecture 300c of FIG. 3C, etc.) may operate such that only a single spine switch (e.g. spine switch 302a) is activated for use and used for IP multicast delivery of media data, so long as bandwidth on the data links to the spine switch is available (i.e. bandwidth limit not yet reached; some bandwidth is unused). When bandwidth on the data links to the selected spine switch becomes unavailable (i.e. bandwidth limit reached; all bandwidth used), then a next one of the spine switches (e.g. spine switch 302b) is activated and used for the IP multicast delivery of media data for new requests. Such operation may be continued and/or repeated for additional spine switches (see e.g. the architecture 300c of FIG. 3C).

Further, data links between spine and leaf switches may be selected for IP multicast delivery of media data with use of link selection modules. In general, the link selection modules may select data lines in a round robin fashion. The link selection modules may be token-based link selection modules for selecting data links while tracking the available/unavailable or used/unused bandwidths on the data links (see e.g. FIGS. 5A-5B and 6A-6B), preferably without use of any hashing-based link selection algorithms. Thus, data links with a given spine switch may be selected in accordance with 5A-5B and 6A-6B until the bandwidth limit for the data links is reached, in which case a new spine switch is activated and used (i.e. a copy of the data may be made to the newly-selected spine switch) (see e.g. operation in relation to FIG. 7).

Figure 5A:
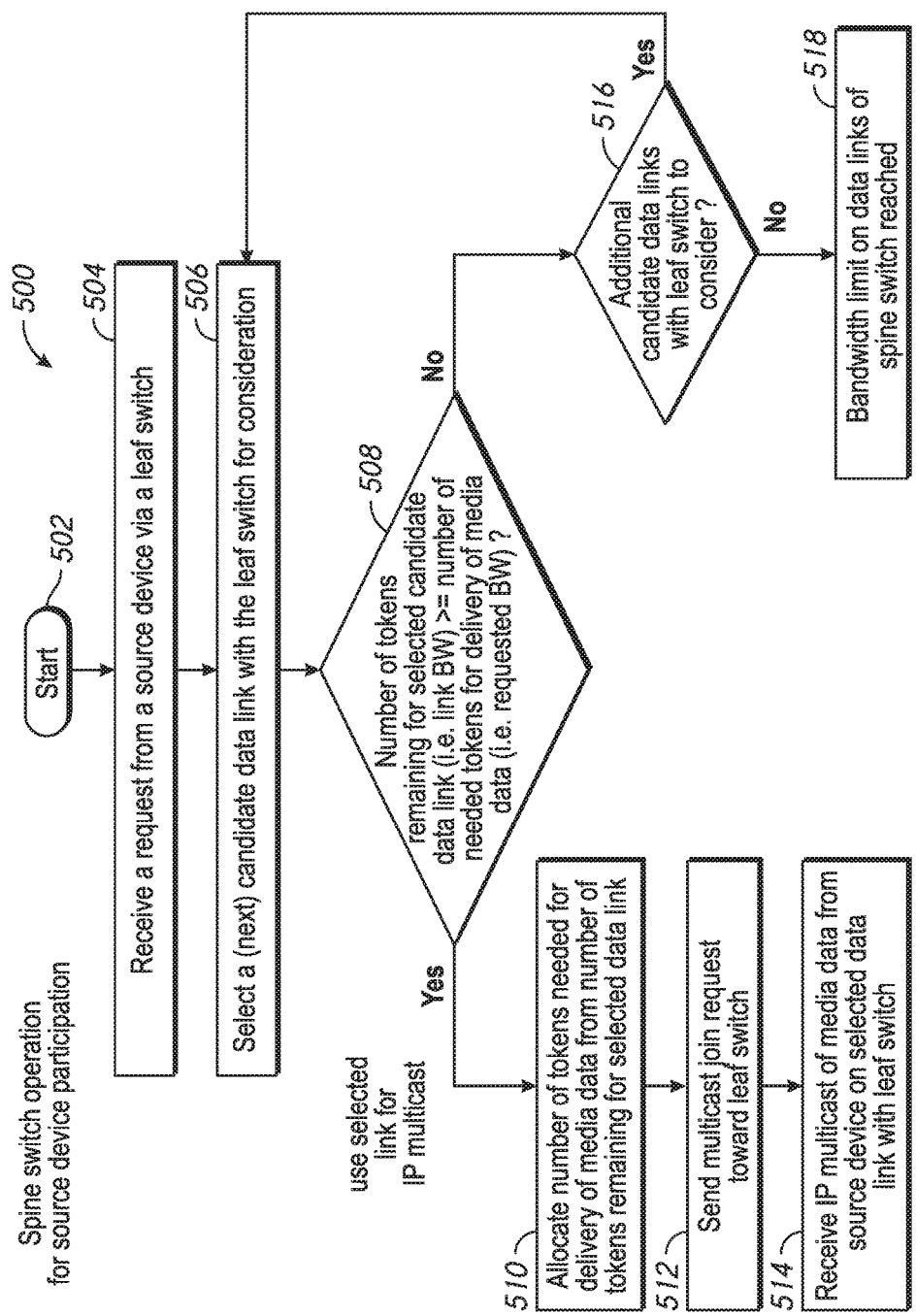
FIG. 5A is a flowchart for describing a method of operation of a spine switch for source device participation, for use in providing a non-blocking IP multicast delivery of media data according to some implementations of the present disclosure.
Figure 5B:
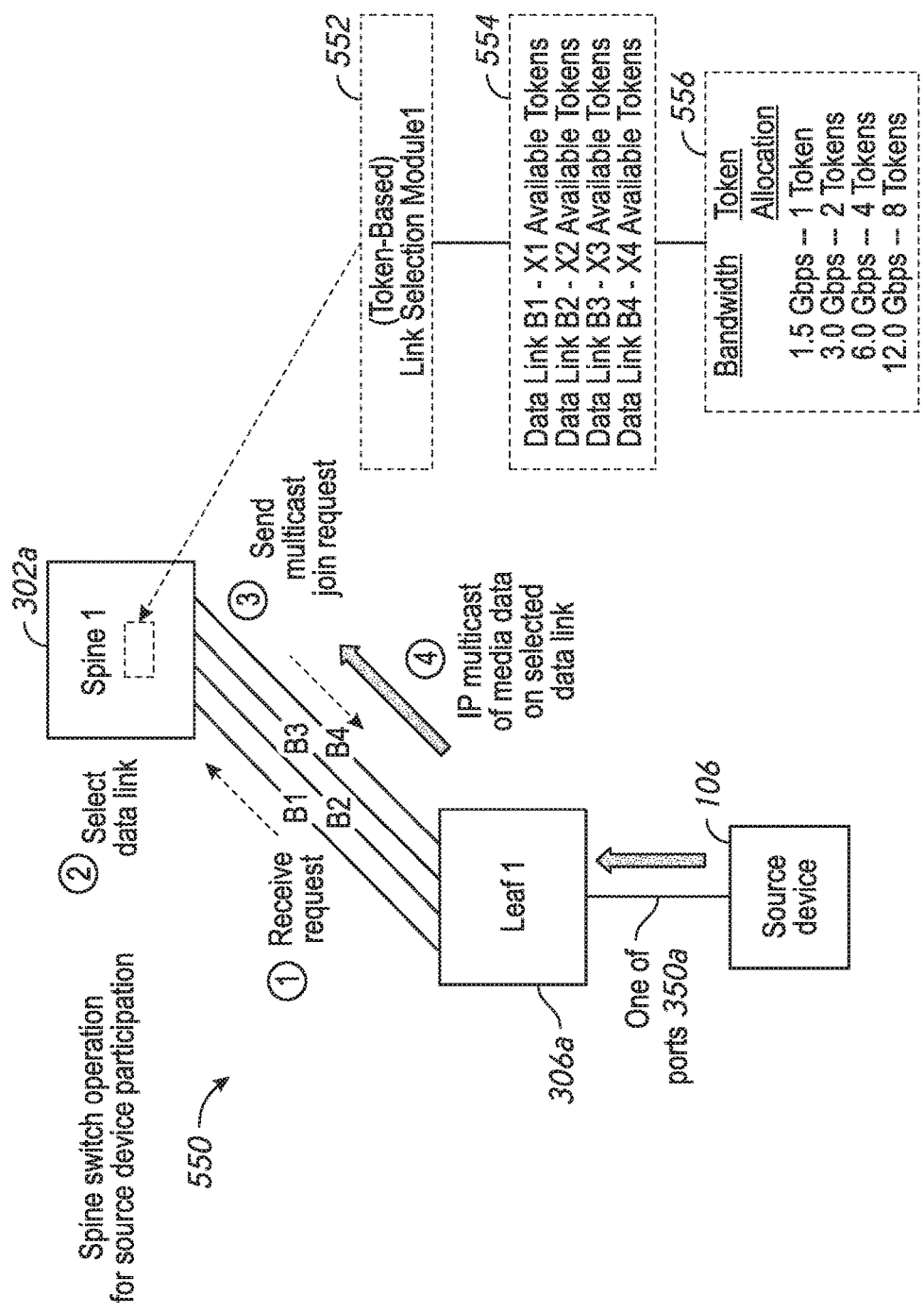
FIG. 5B is a process flow diagram for describing the method of operation of a spine switch for source device participation corresponding to the flowchart of FIG. 5A.

FIG. 5A is a flowchart 600 for describing a method of operation of a spine switch for source device participation, for use in providing a non-blocking IP multicast delivery of media data in an IP network media data router according to some implementations of the present disclosure. Relatedly, FIG. 5B is a process flow diagram 550 for describing the method of operation of the spine switch for source device participation corresponding to the process flow diagram of FIG. 5A.

The method of the flowchart 500 of FIG. 5A will be described in combination with process flow diagram 550 of FIG. 5B. Beginning at a start block 502 of FIG. 5A, a spine switch of the router may receive a request message from a source device via a leaf switch (step 504 of FIG. 5A). See reference point (1) in FIG. 5B. The request message may be or include a protocol independent multicast (PIM) register message for registration of the source device. In response, the spine switch will have to select one of the data links with the leaf switch over which the media data/stream will take place. See reference point (2) in FIG. 5B.

The selection of the data link may be performed with use of a link selection module. Referring to FIG. 5B, a link selection module 552 for use in selecting a data link for the IP multicast delivery of media data is shown. In general, link selection module 552 may select from data links in a round robin fashion. In some implementations, link selection module 552 may further be a token-based link selection module, where bandwidth of the data links is managed, tracked, and/or monitored with use of a stored association 554 between data links and available tokens. Here, data link selection may be performed without use of a hash-based algorithm.

In token-based data link selection, each token may represent a fixed amount of bandwidth. A number of available tokens associated with a given data link may represent the current amount of bandwidth available on the data link. In FIG. 5B, the stored association 554 is shown between data link B1 and X1 available tokens, data link B2 and X2 available tokens, data link B3 and X3 available tokens, and data link B4 and X4 available tokens. An example of a token allocation table 556 is also illustrated in FIG. 5B, showing that a single token represents 1.5 Gbps bandwidth. Here, 1 token may be allocated for 1.5 Gbps bandwidth, 2 tokens may be allocated for 3.0 Gbps bandwidth, 4 tokens may be allocated for 6.0 Gbps bandwidth, 8 tokens may be allocated for 12 Gbps bandwidth, etc. Thus, a token allocation procedure is performed to track the available/unavailable or used/unused bandwidth of the data links. Note that tokens may be deallocated as well when sources and/or receivers withdraw.

Referring back to FIG. 5A, a candidate data link with the leaf switch is selected for consideration (step 506 of FIG. 5A). In general, the selection of candidate data links may be performed in a round robin fashion. It is determined whether the number of tokens available for the candidate data link is greater than or equal to the number of tokens requested or needed for delivery of the media data (step 508 of FIG. 5A). If "no" at step 508 (i.e. there is insufficient bandwidth on the candidate data link), then it may be determined whether there are any additional candidate data links with the leaf switch to consider (step 516 of FIG. 5A). If "yes" at step 516, then a next candidate data link with the leaf switch is selected for consideration at step 506. If "no" at step 516, then a bandwidth limit on the data links with the spine switch has been reached (step 518 of FIG. 5A).

If the number of tokens available for the candidate data link is greater than or equal to the number of tokens requested or needed for delivery of the media data in step 508 (i.e. there is sufficient bandwidth on the candidate data link), then the candidate data link is selected for the IP multicast delivery of the media data. Here, the number of tokens requested or needed for the delivery of the media data is allocated to the communication from the number of tokens available for the data link (step 510 of FIG. 5A). A request to join may be sent to the leaf switch on the selected data link (step 512 of FIG. 5A). The request to join may be a PIM multicast join. See reference point (3) in FIG. 5B. Subsequently, an IP multicast of media data from the source device is received on the selected data link via the leaf switch (step 514 of FIG. 5A). See reference point (4) in FIG. 5B.

Figure 6A:
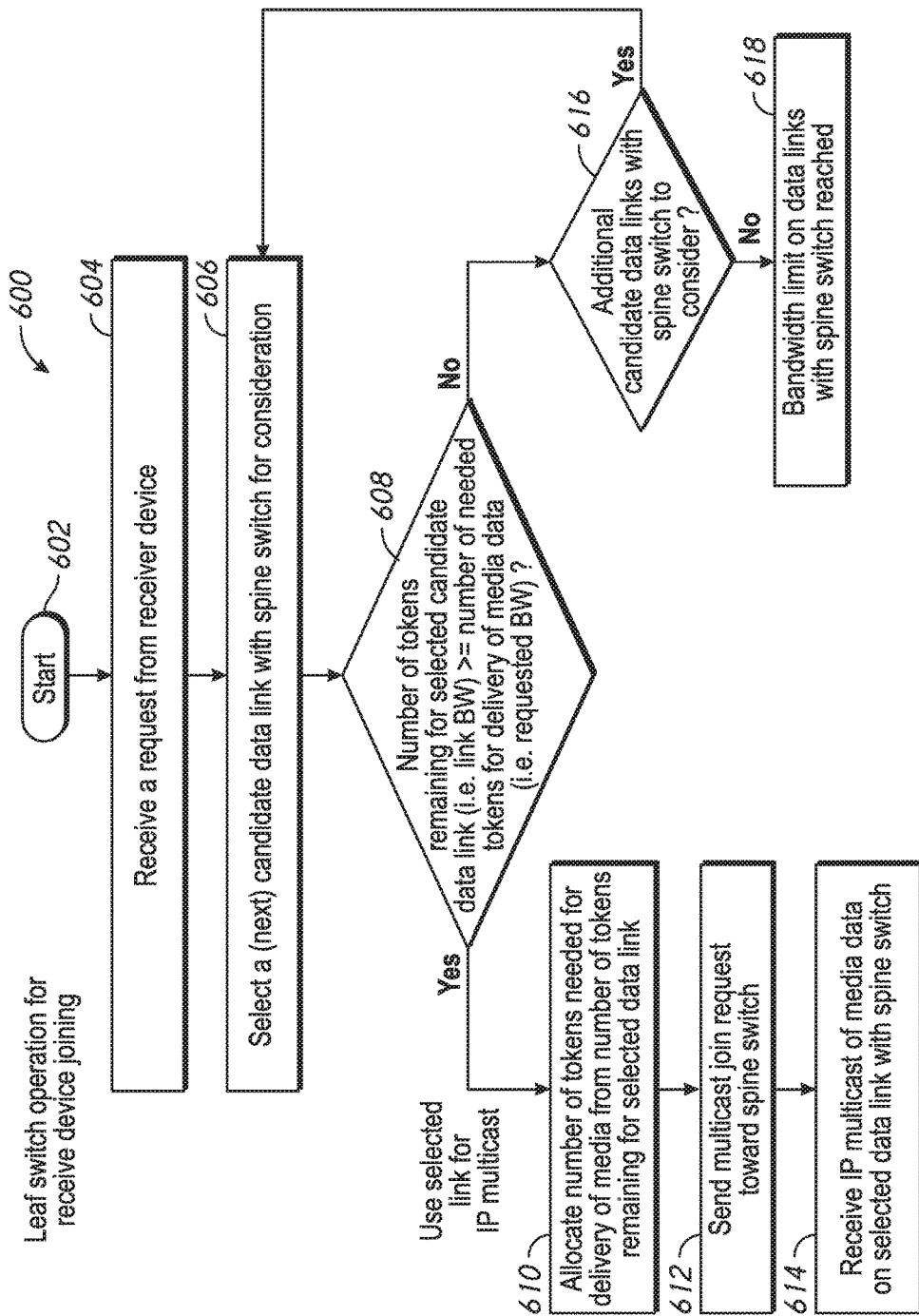
FIG. 6A is a flowchart for describing a method of operation of a leaf switch for receiver device joining, for use in providing a non-blocking IP multicast delivery of media data according to some implementations of the present disclosure.
Figure 6B:
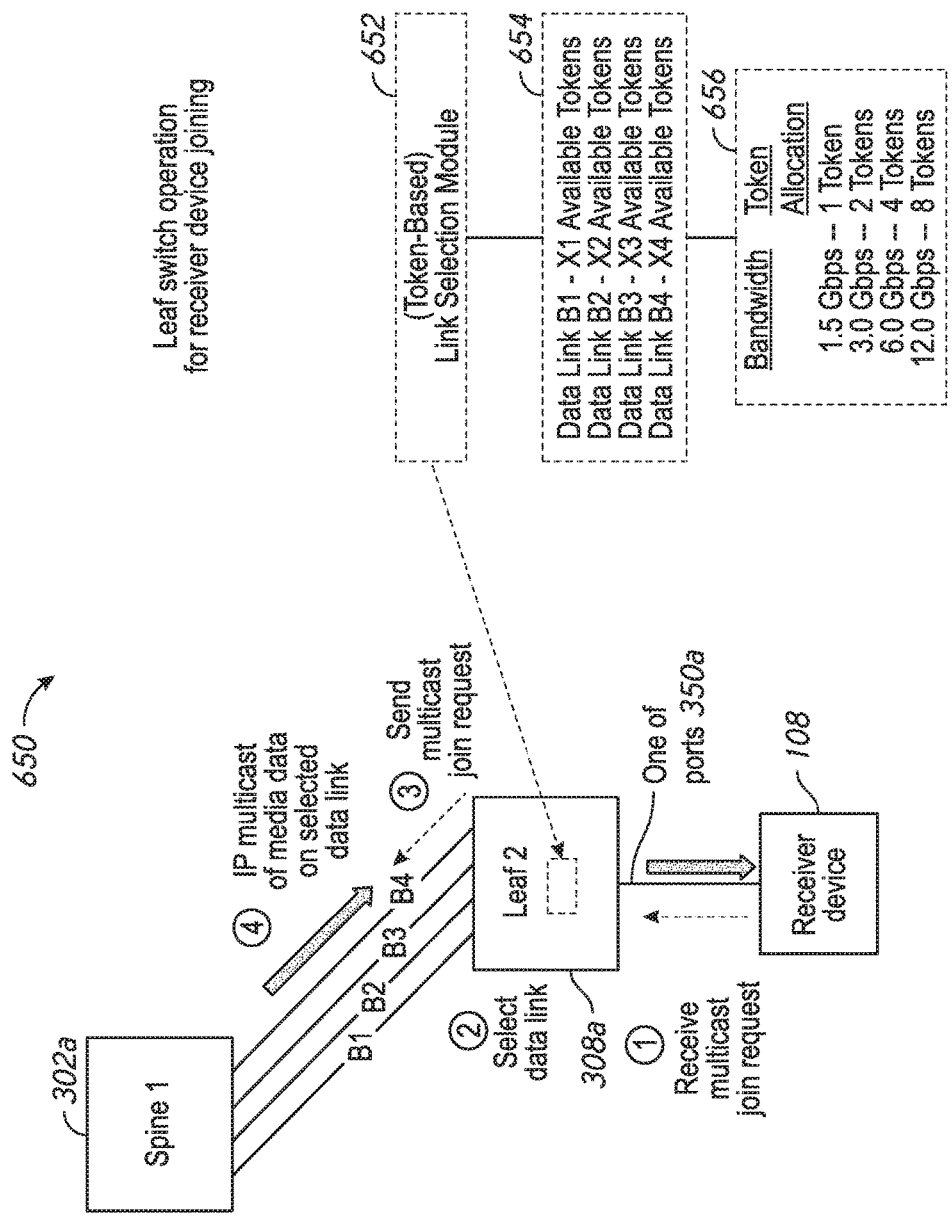
FIG. 6B is a process flow diagram for describing a method of operation of a leaf switch for receiver device joining corresponding to the flowchart of FIG. 6A.

FIG. 6A is a process flow diagram 600 for describing a method of operation of a leaf switch for receiver device joining, for use in providing a non-blocking IP multicast delivery of media data according to some implementations of the present disclosure. Relatedly, FIG. 6B is a flowchart 650 for describing a method of operation of the leaf switch for receiver device joining corresponding to the process flow diagram of FIG. 6A.

The method of the flowchart 600 of FIG. 6A will be described in combination with process flow diagram 650 of FIG. 6B. Beginning at a start block 602 of FIG. 6A, a leaf switch of the router may receive a request message from a receiver device via a bidirectional data port (step 604 of FIG. 6A). The request message may be or include a request to join a multicast group, for example, a PIM multicast join. See reference point (1) in FIG. 6B. In response, the leaf switch will have to select one of the data links with a (currently active) spine switch over which the IP multicast delivery of the media data will take place. See reference point (2) in FIG. 6B.

The selection of the data link may be performed in the leaf switch with use of a link selection module. Operation is similar to that described in the spine switch in relation to FIGS. 5A-5B above, but provided here for completeness. Referring to FIG. 6B, a link selection module 652 for use in selecting a data link for the IP multicast delivery of the media data is shown. In general, link selection module 652 may select from data links in a round robin fashion. In some implementations, link selection module 652 may be a token-based link selection module, where bandwidth of the data links is managed, tracked, and/or monitored with use of a stored association 654 between data links and available tokens. Here, data link selection may be performed without use of a hash-based algorithm.

In the token-based data link selection, each token may represent a fixed amount of bandwidth. A number of available tokens associated with a given data link may represent the current amount of bandwidth available on the data link. In FIG. 6B, the stored association 654 is shown between data link B1 and X1 available tokens, data link B2 and X2 available tokens, data link B3 and X3 available tokens, and data link B4 and X4 available tokens. An example of a token allocation table 656 is also illustrated in FIG. 6B, showing that a single token represents 1.5 Gbps bandwidth. Here, 1 token may be allocated for 1.5 Gbps bandwidth, 2 tokens may be allocated for 3.0 Gbps bandwidth, 4 tokens may be allocated for 6.0 Gbps bandwidth, 8 tokens may be allocated for 12 Gbps bandwidth, etc. Thus, a token allocation procedure may be performed for tracking the bandwidth of the data links. Note that tokens may be deallocated as well when sources and/or receivers withdraw.

Referring back to FIG. 6A, a candidate data link with the leaf switch is selected for consideration (step 606 of FIG. 6A). In general, the selection of candidate data links may be performed in a round robin fashion. It is determined whether the number of tokens available for the candidate data link is greater than or equal to the number of tokens requested or needed for delivery of the media data (step 608 of FIG. 6A). If "no" at step 608 (i.e. there is insufficient bandwidth on the candidate data link), then it may be determined whether there are any additional candidate data links with the spine switch to consider (step 616 of FIG. 6A). If "yes" at step 616, then a next candidate data link with the spine switch is selected for consideration at step 606. If "no" at step 616, then a bandwidth limit on the data links with the spine switch has been reached (step 618 of FIG. 5A).

If the number of tokens available for the candidate data link is greater than or equal to the number of tokens requested or needed for delivery of the media data in step 608 (i.e. there is sufficient bandwidth on the candidate data link), then the candidate data link is selected for the IP multicast delivery of the media data. Here, the number of tokens requested or needed for the delivery of the media data is allocated to the communication from the number of tokens available for the data link (step 610 of FIG. 6A). A request to join may be sent to the spine switch on the selected data link (step 612 of FIG. 6A). The request to join may be a PIM multicast join. See reference point (3) in FIG. 6B. Subsequently, an IP multicast of media data from a source device is received on the selected data link via the spine switch (step 614 of FIG. 6A). See reference point (4) in FIG. 6B.

Figure 7:
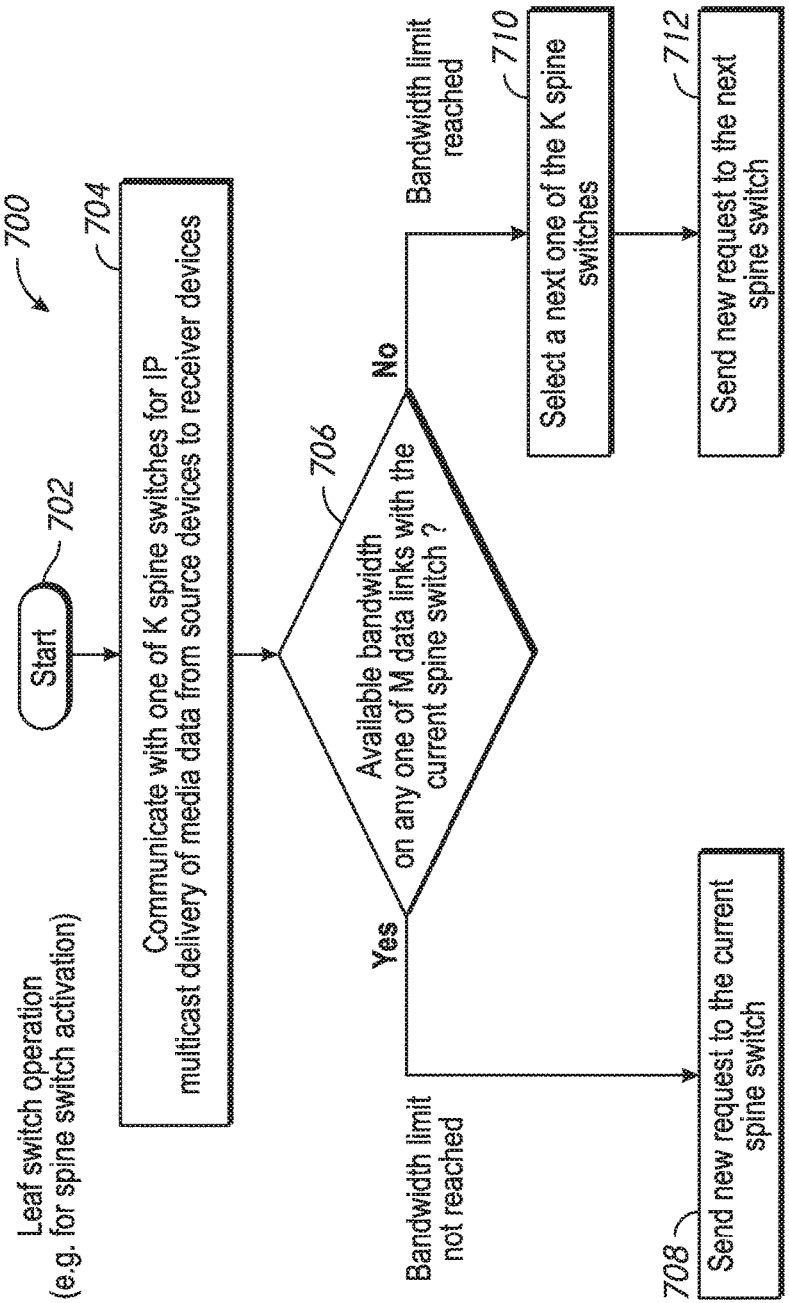
FIG. 7 is a flowchart for describing a method of operation of the IP network media data router (e.g. a leaf switch operation for spine switch activation), for use in providing a non-blocking IP multicast delivery of media data according to some implementations of the present disclosure.

As described, data links with a given spine switch may be selected in accordance with FIGS. 5A-5B and 6A-6B until the bandwidth limit for the data links is reached, in which case a new spine switch is activated and used (i.e. a copy of incoming data traffic is made to the newly-selected spine switch) (see e.g. FIG. 7).

FIG. 7 is a flowchart 700 for describing a method of operation of a leaf switch (e.g. for spine switch activation), for use in providing a non-blocking IP multicast delivery of media data according to some implementations of the present disclosure.

Beginning at a start block 702 of FIG. 7, a leaf switch may communicate with one of K spine switches for IP multicast delivery of media data from source devices to receiver devices (step 704 of FIG. 7). To serve a new request from a device, it is identified whether there is any available bandwidth on the data links with the current spine switch (step 706 of FIG. 7). If there is available bandwidth on the data links with the current spine switch ("yes" branch of step 706), then the new request is sent or forwarded to the current spine switch for data link selection (step 708 of FIG. 7). If there is no available bandwidth on the data links with the current spine switch ("no" branch of step 706), then a next one of the spine switches is selected (step 710 of FIG. 7) and the new request is sent or forwarded to the newly-selected spine switch (step 712 of FIG. 7).

Thus, as provided above in the description, especially in relation to FIGS. 5A-5B, 6A-6B, and 7, a technique is performed which involves selecting from a first plurality of M data links (e.g. in a generally round robin fashion) with a first one of the K spine switches for IP multicast delivery from source devices while a first bandwidth limit on the first plurality of M data links has not been reached; and selecting from a second plurality of M data links (e.g. in a generally round robin fashion) with a second one of the K spine switches for IP multicast delivery from additional source devices while the first bandwidth limit on the first plurality of M data links has been reached, and a second bandwidth limit of the second plurality of M data links has not been reached. Here, token allocation procedures may be performed for tracking first and second used/unused bandwidths of the first and the second pluralities of M data links, for example, with use of stored associations between the first and the second pluralities of M data links and available tokens.

As described herein, an IP network media data router of the present disclosure may be suitable for use in the delivery of media data, such as video for live studio broadcast production. The router may include a spine and leaf switch architecture operative to provide IP multicast communications of data from source devices to receiver devices. The architecture may include K spine switches, K sets of L leaf switches, M data links between each leaf switch and each spine switch where each data link is provided or set with a maximum link bandwidth $BW_L$, and a plurality of bidirectional data ports connected to each leaf switch. In preferred implementations, the router may be provided or specified with a maximum number of bidirectional data ports $N=(a/K) \times (BW_L/BW_P)$ for non-blocking IP multicast delivery of data at a maximum port bandwidth of $BW_P$, where a is a fixed constant greater than or equal to K. More specifically, the non-blocking may be a guaranteed non-blocking IP multicast delivery.

In some implementations, the above-described architecture may be reconfigurable or expandable to include C additional spine switches and C additional sets of L leaf switches (e.g. of the same or similar manufacture as the initial architecture), where at least some of the M data links are redistributed and/or reconnected so that the number of data links between each leaf switch and each spine switch $M_{new}=(K_{old} \times M_{old})/(K_{old}+C)=a/K_{new}$. Here, the number of bidirectional data ports may be limited or reduced to $N_{new}=(K_{old} \times N_{old})/(K_{old}+C)$, or the maximum port bandwidth may be limited or reduced to $BW_{P\,new}=(K_{old} \times BW_{P\,old})/(K_{old}+C)$. Here, the architecture may be provided or specified with a new maximum number of bidirectional data ports $N_{new}=(a/K_{new}) \times (BW_L\,BW_P)$ for a continued, guaranteed non-blocking IP multicast delivery.

In addition, a technique according to some implementations of the present disclosure may include providing an IP network media data router having a spine and leaf switch architecture which operates to provide IP multicast delivery of media data from source devices to receiver devices, where the architecture includes K spine switches, K sets of L leaf switches, M data links between each leaf switch and each spine switch where each data link is provided with a maximum link bandwidth $BW_L$, and a plurality of bidirectional data ports connected to each leaf switch; and providing a number of the bidirectional data ports $N=(a/K) \times (BW_L/BW_P)$ for non-blocking IP multicast delivery of data at a maximum port bandwidth of $BW_P$. The technique may further include providing for a reconfiguration or expansion of the architecture to include C additional spine switches and C additional sets of L leaf switches, which may further include providing for a redistribution or reconnection of the M data links so that the new number of data links between each leaf switch and each spine switch is $M_{new}=(K_{old} \times M_{old})/(K_{old}+C)=a/K_{new}$. The technique may further include providing for a limitation on or a reduction of the number of bidirectional data ports to $N_{new}=(K_{old} \times N_{old})(K_{old}+C)$, or a limitation on or a reduction of the maximum port bandwidth to $BW_{P\,new}$ to $(K_{old} \times BW_{P\,old})/(K_{old}+C)$, wherein the relation $N_{new}=(a/K_{new}) \times (BW_L\,BW_P)$ is maintained for maintaining the non-blocking IP multicast delivery of data.

In some implementations of the above-described technique, providing for the redistribution or reconnection of the M data links may be performed at least in part by reconnecting at least some of the data links between each leaf switch and each spine switch. In addition, or alternatively, providing for the redistribution or the reconnection of the M data links may be performed at least in part by providing instructions or guidelines on the connecting or reconnecting of the data links. Also in some implementations of the above-described technique, providing for the limitation on or the reduction may be performed at least in part by limiting the number or use of the bidirectional data ports. In addition, or alternatively, providing for the limitation on or the reduction may be performed at least in part by providing instructions or guidelines on limiting the number or use of the bidirectional data ports.

In some other implementations of the present disclosure, a technique includes providing an IP network media data router having a spine and leaf switch architecture which operates to provide IP multicast delivery of media data from source devices to receiver devices, where the architecture including K spine switches, K sets of L leaf switches, M data links between each leaf switch and each spine switch where each data link is provided with a maximum link bandwidth $BW_L$, and a plurality of bidirectional data ports connected to each leaf switch, wherein a maximum number of the bidirectional data ports $N=(a/K) \times (BW_L/BW_P)$ is provided or specified for non-blocking IP multicast delivery of data at a maximum port bandwidth of $BW_P$. The technique further includes reconfiguring or expanding the architecture to include C additional spine switches and C additional sets of L leaf switches, redistributing or reconnecting at least some of the M data links so that the number of data links between each leaf switch and each spine switch is $M_{new}=(K_{old} \times M_{old})/(K_{old}+C)=a/K_{new}$; and limiting or reducing the number of bidirectional data ports for use to $N_{new}=(K_{old} \times N_{old})/(K_{old}+C)$, or the maximum port bandwidth for use to $BW_{P\,new}=(K_{old} \times BW_P)/(K_{old}+C)$, where a new maximum number of the bidirectional data ports $N=(a/K) \times (BW_L/BW_P)$ is provided or specified for (guaranteed) non-blocking IP multicast delivery of data at a maximum port bandwidth of $BW_P$.

According to some other aspects of the present disclosure, a product-by-process is provided. What is initially provided or obtained is an IP network data router which includes a spine and leaf switch architecture operative to provide IP multicast delivery of data from source devices to receiver devices. The initial architecture includes K spine switches, K sets of L leaf switches, M data links between each leaf switch and each spine switch, and a plurality of bidirectional data ports connected to each leaf switch. A maximum number of the bidirectional data ports $N=(a/K)\times(BW_L/BW_P)$ is provided or specified for non-blocking IP multicast delivery of data at a maximum port bandwidth of $BW_P$. In some implementations, K=1 and a=4. See e.g. FIG. 3A. This initial architecture is reconfigured or expanded by adding C additional spine switches and C additional sets of L leaf switches, redistributing or reconnecting at least some of the M data links so that the number of data links between each leaf switch and each spine switch is $M_{new}=(K_{old}\times M_{old})/(K_{old}+C)=a/K_{new}$; and limiting or reducing the number of bidirectional data ports for use to $N_{new}=(K_{old}\times N_{old})/(K_{old}+C)=a/K_{new}$, or the maximum port bandwidth $BW_P$ for use $BW_{P\ new}=(K_{old}\times BW_P)/(K_{old}+C)$, where a new number of the bidirectional data ports $N_{new}=(a/K_{new})\times(BW_L/BW_P)$ is provided or specified for non-blocking IP multicast delivery of data at a maximum port bandwidth of $BW_P$. See e.g. FIG. 3B where a=4 and C=1 (i.e. K=2), and/or FIG. 3C where a=4 and C=3 (i.e. K=4). Thus, what is thereafter provided or obtained by the resultant product-by-process is an expanded, non-blocking IP network data router.

Note that the components and techniques shown and described in relation to the separate figures may indeed be provided as separate components and techniques, and alternatively one or more (or all of) the components and techniques shown and described in relation to the separate figures are provided together for operation in a cooperative manner.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first spine switch could be termed a second spine switch, and, similarly, a second spine switch could be termed a first spine switch, which changing the meaning of the description, so long as all occurrences of the "first spine switch" are renamed consistently and all occurrences of the second spine switch are renamed consistently. The first spine switch and the second spine switch are both spine switches, but they are not the same spine switch.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. An IP network data router comprising:
a spine and leaf switch architecture operative to provide IP multicast communications, the architecture including:
K spine switches;
K sets of L leaf switches;
M data links between each leaf switch and each spine switch, each data link being provided with a maximum link bandwidth of $BW_L$;
a plurality of bidirectional data ports connected to each leaf switch,
wherein the router is provided or specified with a maximum number of bidirectional data ports $N=(a/K)\times(BW_L/BW_P)$ for non-blocking IP multicast delivery of data at a maximum port bandwidth of $BW_P$, where a is a fixed constant greater than or equal to K, wherein the architecture is further operative to:
select from a first plurality of M data links with a first one of the K spine switches for the IP multicast delivery of data from source devices while a first bandwidth limit of the first plurality of M data links has not been reached;
select from a second plurality of M data links with a second one of the K spine switches for the IP multicast delivery of data from additional source devices while the first bandwidth limit of the first plurality of M data links has been reached and a second bandwidth limit of the second plurality of M data links has not been reached; and
perform a token allocation procedure for tracking a first bandwidth of the first plurality of M data links with use of a stored association between the first plurality of data links and available tokens.

2. The router of claim 1, wherein the router is provided or specified with the maximum number of bidirectional data ports $N=(a/K)\times(BW_L/BW_P)$ for a guaranteed non-blocking IP multicast delivery of the data.

3. The router of claim 1, wherein K=1 and $2\leq a\leq 10$.

4. The router of claim 3, further comprising:
wherein the architecture is reconfigurable or expandable to include C additional spine switches and C additional sets of L leaf switches, where at least some of the data links are one or more of redistributed and reconnected so that the new number of M data links between each leaf switch and each spine switch is $M_{new}=(K_{old} \times M_{old})/(K_{old}+C)=a/K_{new}$, and
wherein the router is provided or specified with a new maximum number of bidirectional data ports $N_{new}=(a/K_{new}) \times (BW_L/BW_P)$ for non-blocking IP multicast delivery of data at a maximum port bandwidth of $BW_P$.

5. The router of claim 4, wherein C=1.

6. The router of claim 1, wherein K=2 and $2 \leq a \leq 10$.

7. The router of claim 6, further comprising:
wherein the architecture is reconfigurable or expandable to include C additional spine switches and C additional sets of L leaf switches, where at least some of the M data links are one or more of redistributed and reconnected so that the new number of M data links between each leaf switch and each spine switch is $M_{new}=(K_{old} \times M_{old})/(K_{old}+C)=a/K_{new}$, and
wherein the router is provided or specified with a new maximum number of bidirectional data ports $N_{new}=(a/K_{new}) \times (BW_L/BW_P)$ for non-blocking IP multicast delivery of data at a maximum port bandwidth of $BW_P$.

8. The router of claim 1, comprising a router for media data which is operative to provide the IP multicast delivery of media data with use of a multicast protocol comprising an Internet Group Management Protocol (IGMP).

9. A method comprising:
providing an IP network data router having a spine and leaf switch architecture which operates to provide IP multicast delivery of data from source devices to receiver devices, the architecture including K spine switches, K sets of L leaf switches, M data links between each leaf switch and each spine switch, each data link being provided with a maximum link bandwidth of $BW_L$, a plurality of bidirectional data ports connected to each leaf switch, wherein the router is provided or specified with a maximum number of bidirectional data ports $N=(a/K) \times (BW_L/BW_P)$ for non-blocking IP multicast delivery of data at a maximum port bandwidth of $BW_P$, where a is a fixed constant greater than or equal to K;
selecting from a first plurality of M data links with a first one of the K spine switches for the IP multicast delivery of data from source devices while a first bandwidth limit of the first plurality of M data links has not been reached;
selecting from a second plurality of M data links with a second one of the K spine switches for the IP multicast delivery of data from additional source devices while the first bandwidth limit of the first plurality of M data links has been reached and a second bandwidth limit of the second plurality of M data links has not been reached; and
performing a token allocation procedure for tracking a first bandwidth of the first plurality of M data links with use of a stored association between the first plurality of data links and available tokens.

10. The method of claim 9, wherein the router is provided or specified with the maximum number of bidirectional data ports $N=(a/K) \times (BW_L/BW_P)$ for a guaranteed non-blocking IP multicast delivery of the data.

11. The method of claim 9, wherein K=1 and $2 \leq a \leq 10$.

12. The method of claim 11, further comprising:
wherein the architecture is reconfigurable or expandable to include C additional spine switches and C additional sets of L leaf switches, where at least some of the data links are one or more of redistributed and reconnected so that the new number of M data links between each leaf switch and each spine switch is $M_{new}=(K_{old} \times M_{old})/(K_{old}+C)=a/K_{new}$, and
wherein the router is provided or specified with a new maximum number of bidirectional data ports $N_{new}=(a/K_{new}) \times (BW_L/BW_P)$ for non-blocking IP multicast delivery of data at a maximum port bandwidth of $BW_P$.

13. The method of claim 12, wherein C=1.

14. The method of claim 9, wherein K=2 and $2 \leq a \leq 10$.

15. The method of claim 14, further comprising:
wherein the architecture is reconfigurable or expandable to include C additional spine switches and C additional sets of L leaf switches, where at least some of the M data links are one or more of redistributed and reconnected so that the new number of M data links between each leaf switch and each spine switch is $M_{new}=(K_{old} \times M_{old})/(K_{old}+C)=a/K_{new}$, and
wherein the router is provided or specified with a new maximum number of bidirectional data ports $N_{new}=(a/K_{new}) \times (BW_L/BW_P)$ for non-blocking IP multicast delivery of data at a maximum port bandwidth of $BW_P$.

16. The method of claim 9, comprising a router for media data which is operative to provide the IP multicast delivery of media data with use of a multicast protocol comprising an Internet Group Management Protocol (IGMP).

17. The method of claim 9, wherein the router tracks bandwidth of at least a subset of the M data links and selects the subset of the M data links for the non-blocking IP multicast delivery of data based on the bandwidth of the subset of the M data links.

18. The system of claim 1, wherein the router tracks bandwidth of at least a subset of the M data links and selects the subset of the M data links for the non-blocking IP multicast delivery of data based on the bandwidth of the subset of the M data links.

* * * * *